Patented June 12, 1934

1,962,683

UNITED STATES PATENT OFFICE 1,962,683

MANUFACTURE OF NEW OR IMPROVED FABRIC

Camille Dreyfus, New York, N. Y.

No Drawing. Application December 15, 1925, Serial No. 75,654

1 Claim. (Cl. 18—48)

This invention has for its object to produce new or improved ornamental or patterned fabrics.

This invention applies to woven, knitted or other fabrics composed wholly or partly of yarns consisting of or comprising cellulose acetate or other organic acid esters of cellulose or ethyl-, methyl-benzyl- or other ethers of cellulose, or other low flammable thermoplastic cellulose derivatives.

According to this invention an ornamental or patterned fabric is produced by subjecting a fabric of the class above referred to to the local application of pressure at such temperature as will enable the desired pattern, ornament, figure or design to be impressed on, and retained by, the fabric.

Any suitable device capable of forming the desired pattern ornament, figure or design with the aid of applied pressure may be employed.

Conveniently the fabrics are subjected to the action of heated rollers, plates or other devices, engraved or otherwise formed so as to produce any desired pattern, ornament, figure or design.

The attractive effect, so produced is apparently due to a melting or softening action exerted upon the filaments of the yarns of thermoplastic material by the heat and pressure applied. The degree of the melting or softening action may vary widely, according to the conditions of heat and pressure, or other circumstances, from a simple glazing without coalescence of the filaments or yarns to complete melting and coalescence of the filaments or yarns of thermoplastic material at the parts concerned.

The invention is more especially applicable for the production of ornamental or patterned fabrics consisting wholly or partly of cellulose acetate yarns.

In carrying out the invention any suitable devices may be employed for impressing the pattern or ornament by heat upon the fabrics as referred to. For example the fabric may be passed between heated rollers one or both of which is engraved or formed with the required pattern or ornament in relief or in intaglio, or between one such roller bearing the required pattern or ornament and a heated plate or surface, or it may be pressed between two heated plates or surfaces one or both of which bear the required pattern or ornament in relief or intaglio, or any other appropriate devices may be employed for the purpose. If desired, only one of the rollers or other devices between the surfaces of which the fabric is pressed to produce the pattern or ornament thereon may be heated, said heated device being usually formed or provided with the pattern or ornament to be impressed on the fabric.

If desired one may employ any known plasticizing or softening agents or camphor substitutes or solvents, (preferably high-boiling or relatively high-boiling), of the cellulose acetate or other thermoplastic material of the fabric, to increase or accelerate the glazing or melting effect of the heat and pressure upon the thermoplastic material of the fabric.

As some instances of such plasticising or softening agents, camphor substitutes or high-boiling solvents there may be mentioned for example triacetin, paratoluene sulphonamide or its derivatives, diethyl phthalate, paratoluene sulphonanilide, high boiling alkylated xylene-sulphonamide derivatives or preparations (for instance monomethyl xylene sulphonamide), and so forth, but any other suitable plasticising or softening agents or solvents may be employed.

The plasticising or softening agents, camphor substitutes or solvents may be applied to the fabric before it is subjected to the hot impression, or they may be incorporated in the filaments or fibres of the cellulose derivatives themselves in the production thereof, for example by employing such agents or solvents in the spinning solutions.

If applied to the fabric, the said plasticising or softening agents, camphor substitutes or solvents may be applied in any convenient way, for instance in solution in a solvent of them which is a non-solvent of the cellulose acetate or other thermoplastic cellulose derivatives of the yarns.

The degrees of heat and pressure employed in effecting the impression of the patterns, ornaments or designs on the fabrics may vary considerably according to the degree of melting or softening effect to be exerted on the filaments or fibres of thermoplastic cellulose derivatives and to whether plasticising or softening agents, camphor substitutes or solvents are employed or not, less heat or less pressure sufficing for a given effect when such agents or solvents are employed.

The manner in which the invention may be carried into effect can be illustrated by the following example, it being understood that this is given only by way of illustration and can be varied widely.

*Example.*—A woven or warp knitted fabric composed of cellulose acetate yarns is passed slowly through between a pair of steel, copper, or other rollers one or both of which is engraved or formed with the desired pattern, ornament or other device in relief or intaglio, the rollers being heated to about 90°-110° C. and exerting a pressure of about 300-600 lbs. per square inch upon the material passing slowly between them.

If desired, the cellulose acetate fabric may be treated with a plasticising or softening agent or solvent prior to receiving the impression under heat. For example it may be treated by dipping or spraying with a solution of monomethyl xylene sulphonamide in a volatile non-solvent of cellulose acetate such as benzol (for instance a solution containing about 20% of monomethyl xylene sulphonamide), the volatile solvent being then allowed to evaporate.

When the fabric is so treated prior to receiving the impression, lower temperatures or less pressure can suffice for the impression.

It is understood that the invention may be applied to fabrics consisting wholly of yarns of cellulose acetate or other thermoplastic cellulose derivatives, or consisting partly of such yarns and partly of yarns of cotton, silk, wool, artificial silk of the cellulose type, or other non-thermo-plastic or relatively non-thermoplastic fibres or filaments. Also that the fabrics may consist of or comprise yarns composed of fibres or filaments of the thermoplastic cellulose derivatives doubled or associated with such other non-thermoplastic fibres or filaments.

The invention comprises not only the process of producing the new ornamental or patterned fabrics but also the ornamental or patterned fabrics produced thereby.

The fabrics treated may of course be dyed or undyed when subjected to the hot impression to produce the patterns, ornaments or designs upon them.

Having now particularly described and ascertained the nature of my said invention and in what manner the same is to be performed I declare that what I claim is:—

A process for the ornamentation of fabrics containing individual filaments of cellulose acetate which comprises treating at least portions of the fabric with a solution of a softening agent for the cellulose acetate in a liquid which is not a solvent for the cellulose acetate, permanently deforming the individual filaments of portions of the fabric by subjecting the same to pressure from heated devices formed with a design thereon, thereby producing effects ranging from a simple glazing without coalescence of the individual filaments to complete coalesence of the cellulose acetate filaments in said portions of the fabric.

CAMILLE DREYFUS.